Jan. 17, 1939. P. B. PARKS ET AL 2,144,121
MODULATED HEATING SYSTEM
Filed Sept. 18, 1936
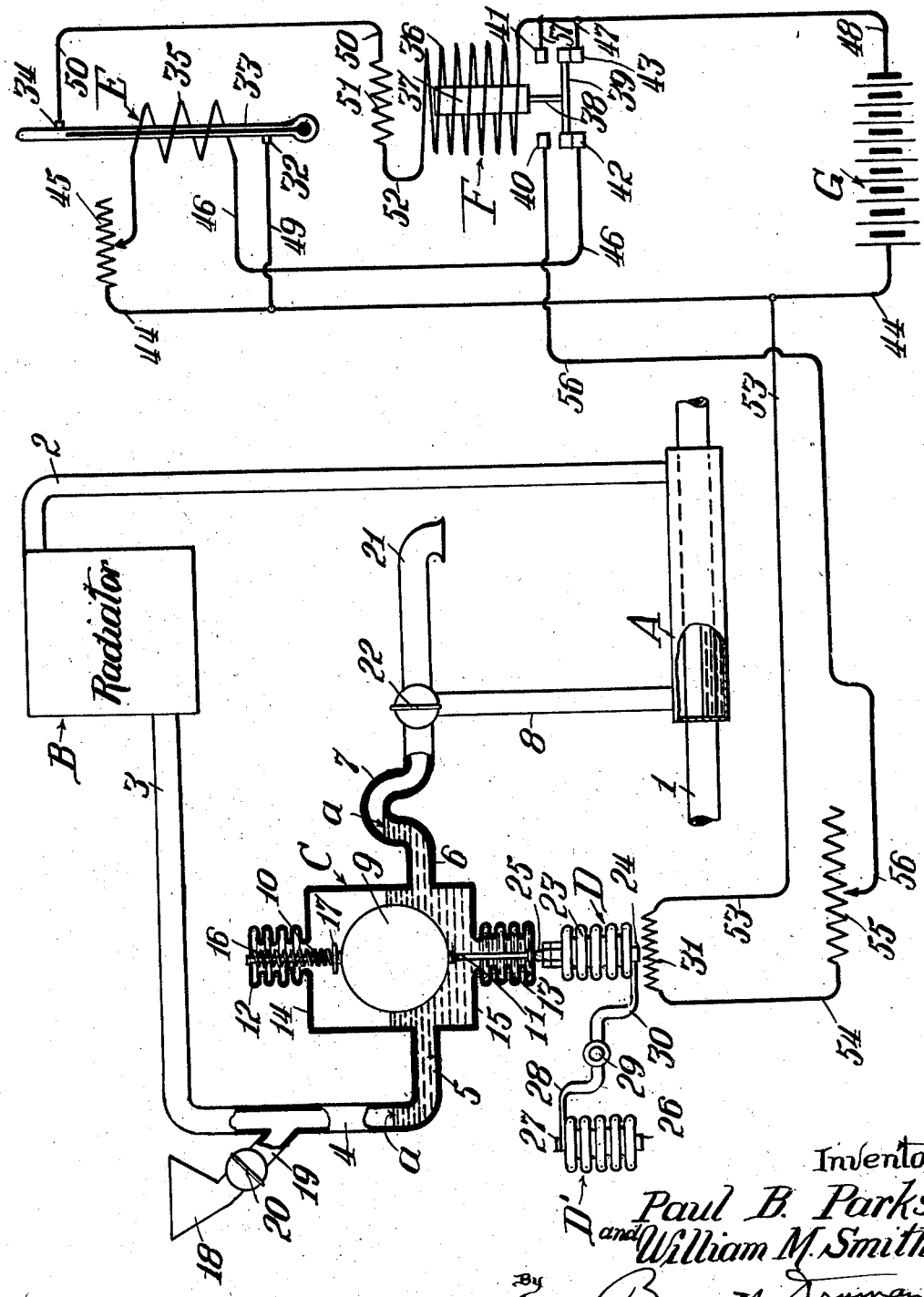
Inventors
Paul B. Parks
and William M. Smith
By Barnett & Truman
Attorneys Patented Jan. 17, 1939

2,144,121

UNITED STATES PATENT OFFICE 2,144,121

MODULATED HEATING SYSTEM

Paul B. Parks, Oak Park, and William M. Smith, Chicago, Ill., assignors to Vapor Car Heating Company, Inc., Chicago, Ill., a corporation of New York Application September 18, 1936, Serial No. 101,464

11 Claims. (Cl. 237—9)

This invention relates to certain new and useful improvements in a modulated heating system, more particularly a steam heating system in which the rate of steam generation is proportioned in accordance with the amount of variation of the temperature prevailing within the space to be heated from a certain predetermined desired temperature.

According to this invention the steam heating system is of a simple closed loop type using a small quantity of water which is successively flashed into steam by means of a rather high temperature source of heat, then condensed in a radiator to deliver this heat to the space to be heated, the condensate then being returned to the steam generator. Means is provided for regulating the rate of return of condensate to the generator so as to control the heating effect of the system. This control of the water supply to the generator is effected by means including an electric heating element intermittently energized from a thermostatic assembly which responds to temperature changes within the space being heated. The thermostat which determines the temperature to be maintained acts to complete a relay-energizing circuit when this temperature is reached. An electric heating element associated with the thermostat is energized through the relay whenever the relay-energizing circuit is broken, that is whenever the prevailing temperature at the thermostat falls below the predetermined temperature. Shortly after this additional heat from the heating element is applied to the thermostat it will again function to complete the relay-energizing circuit, whereupon the energizing circuit for the thermostat heating element will again be broken. As a consequence the thermostat will function at short intervals to alternately make and break the relay-energizing circuit, and the relay functions in turn to alternately make and break the energizing circuit for the heating element which controls the water supply for the steam heating system. The duration or length of the heating impulses imparted to the electric heating elements will vary in proportion to the differential existing between the space temperature at the location of the thermostat and the predetermined desired temperature. As a result, the rate of steam generation and the heat output from the steam heating system will be modulated so as to just balance the heat loss from the space and maintain the desired temperature within the space.

The principal object of this invention is to provide an improved modulated heating system of the type briefly described hereinabove and disclosed more in detail in the specifications which follow.

Another object is to provide an improved form of steam heating system.

Another object is to provide an improved form of thermostatic controlling apparatus for a steam heating system.

Another object is to provide an improved water-supply control for a steam heating system.

Another object is to provide an improved thermostatic control mechanism for a heating system, said apparatus including an expansible thermostatic motor actuated by selected heat impulses from an electric heating element.

Other objects and advantages of this invention will be more apparent from the following detailed description of one approved form of apparatus constructed and operating according to the principles of this invention.

The accompanying drawing is a diagrammatic view, mostly in central vertical section, of the principal elements of the apparatus, together with a wiring diagram of the electrical mechanism.

The steam heating system comprises generally the boiler or generator A, the radiator B, and the water-supply tank C provided with means for determining the amount of water retained therein and thereby determining the proportionate amount of the total water supply delivered back into the generator. At D is indicated a heat controlled thermostatic motor adapted to actuate and adjust the water-control mechanism in tank C. The electrical control system which delivers the heat impulses to motor D comprises the thermostatic assembly E responsive to changes in the room temperature condition, the relay F which cooperates with this thermostat and the source of electric power G.

The steam heating system is of the completely closed loop type in which a rather small quantity of water is more or less continuously circulated through the loop either in the liquid or gaseous state. The rate of steam supply to the radiator or radiators, and consequently the rate of heat output from the heating system, is controlled by regulating the rate of water supply to the generator in which this water is quite rapidly converted into steam. The generator A as here shown is in the form of a rather small cylindrical boiler fitted about a portion of the highly heated pipe line 1 through which flows any highly heated medium. For example this may be a steam pipe or it may be the exhaust pipe of an internal combustion engine. The maximum quantity of water in this boiler will always be small relative to the source of heat and the water will be rapidly converted into steam which flows out through pipe 2 to the radiator B. The steam will be condensed in the radiator and give out most of its heat, the condensate flowing back through pipes 3, 4 and 5 into the water-supply tank C. The overflow pipe 6 leading from the lower portion of tank C is provided with the upwardly extending half-loop portion 7, and the downwardly extending branch 8 through which water is returned into generator A. The height of the upwardly looped portion 7 of the overflow pipe determines the water level a in the tank C and also in the supply and discharge pipes.

A displacement member 9, preferably in the form of a hollow float, is disposed within the tank C, and stems 10 and 11 extending upwardly and downwardly from this displacement member are connected to similar upper and lower expansible bellows or diaphragm members 12 and 13 which are connected to and form parts of the top 14 and bottom 15 respectively of tank C. The diaphragms 12 and 13 permit vertical movement of the float and stem assembly with respect to tank C while at the same time maintaining the tank completely sealed or closed at all times except for the inlet and outlet pipes 5 and 6. Since the two similar bellows diaphragms 12 and 13 are subject to the same external atmospheric conditions, they act as equalizing members so that variations in the external pressure or temperature adjacent the supply tank C do not affect the positioning of the displacement member 9. A compression spring 16 surrounding the upper stem 10 and confined between the upper end of bellows 12 and a shoulder or plate 17 on the stem, exerts a downward pressure on the float so as to oppose the buoyant effect of the water and to keep the float partially submerged. When float 9 is in its normal lowermost position a maximum quantity of the total liquid in the system will be displaced and will overflow into generator A. On the other hand, when float 9 is lifted to its extreme uppermost position the minimum quantity of liquid will be displaced and substantially all of the water in the system will be retained in tank C. Water may be supplied to the system through funnel 18 and pipe 19 provided with the normally closed cut-off valve 20. A discharge pipe 21 is provided, and a two-way valve 22 may be positioned at the juncture of the pipes 6, 8 and 21. The valve 22 will normally be so positioned as to establish communication between pipes 6 and 8 and cut off the overflow pipe 21. When turned to its second position, valve 22 will establish communication between pipes 6 and 21 and shut off the supply pipe 8 leading to the generator. With valve 22 in this position, valve 20 open, and float 9 lifted to its uppermost position, the system may be filled to the desired level by pouring water through funnel 18, any excess water flowing out through discharge pipe 21. Valves 20 and 22 are then returned to their normal positions and when float 9 is lowered to its normal position the desired quantity of water will overflow into generator A.

In operation, assuming that heating medium is present in the pipe 1, the water in generator A will be rapidly converted into steam which passes up through pipe 2 into radiator B and is there condensed. The condensate flows back into tank C (which is already filled to its maximum capacity) and consequently the water overflows and passes back into the generator A. This cycle will continue indefinitely. By lifting the float or displacement member 9, more of this fixed quantity of liquid will be retained in the supply tank C and a smaller quantity will be delivered into generator A so as to cut down the supply of steam to the radiator and decrease the heating effect of the system. By lifting the displacement member to its extreme upper position, all of the water will be retained in supply tank C and the heating system will become ineffective.

In the example here shown, the positioning of the displacement member 9 at any time is determined by the thermostatic motor indicated at D. This motor comprises a closed flexible bellows structure 23 containing a heat-responsive fluid. The bellows is anchored at its lower end 24 and its movable upper end 25 bears against the lower end of the sealing diaphragm 13 or stem 11. When in its normal collapsed position, the plunger 25 at the upper end of bellows 23 will be lowered so as to permit the displacement member 9 to return to its lowermost position. When heat is applied to the bellows diaphragm 23, the fluid therein will expand so as to lift the plunger 25 and thereby elevate the displacement member 9. The distance the displacement member is adjusted upwardly will depend upon the amount of heat applied to the motor D.

A second bellows motor D', similar in all respects to the motor D, is fixedly supported at its lower end 26 and bears at its upper end 27 against one arm 28 of a lever intermediately pivoted at 29. The other arm 30 of this lever supports the anchored end 24 of motor D. It will be apparent that the effect of any changes in atmospheric temperature or pressure in the vicinity of this motor assembly will be the same on each of the motors D and D', and any expansion or contraction of motor D in response to these changes in the prevailing atmospheric conditions will be just compensated for by the corresponding movement of motor D' which adjusts the anchored end 24 of the motor D. Therefore the only movements of motor D that will be transmitted to the displacement member in the supply tank are those resulting from the additional heat supplied to the motor from the electric heating element 31 which is positioned adjacent to the flexible bellows 23.

The heating element 31 is supplied with a series of intermittent heat impulses of selected length or duration by means of the electrically actuated assembly shown at the right of the drawing and comprising the thermostat E, relay F and source of electric power G.

While the thermostat E might take a variety of forms, it is preferably of the mercury column type here shown, and may be of the form disclosed and claimed in the patent to Parks and Miller, 2,046,578, granted July 7, 1936. The thermostat is provided with two spaced apart electric contacts, the lower contact 32 being in constant engagement with the mercury column 33, while the upper contact 34 is only engaged by the mercury column when the instrument responds to some predetermined maximum temperature. When this maximum temperature is reached an electric circuit will be completed through the mercury column, and when the temperature falls below this predetermined maximum the electric circuit will be broken. A heating coil 35 or other equivalent heating element is associated with the thermostat so as to add a predetermined amount of additional heat thereto when the coil is energized. In this manner the circuit will be completed through the thermostat even though the prevailing temperature is lower than the temperature at which the thermostat is designed to function.

The relay F comprises a magnetic coil 36 which when energized will draw up core 37, which through stem 38 lifts movable contact plate 39 into engagement with a pair of fixed contacts 40 and 41. When the magnetic coil is deenergized contact 39 will drop into engagement with a second pair of fixed contacts 42 and 43.

Assuming now that the temperature prevailing at the location of thermostat E is below the predetermined temperature at which the thermostat is designed to function, the relay F will be deenergized. At such times an energizing circuit for the heating element 35 will be completed as follows: From one terminal of power source G through wire 44, adjustable resistance 45, coil 35, wire 46, relay contacts 42, 39 and 43, and wires 47 and 48 to the other terminal of the power source. The additional heat imparted by heating element 35 will cause the mercury column to rise even though the temperature at the location of the thermostat is below the desired temperature, and when the mercury column engages the upper fixed contact 34 an energizing circuit for the relay will be completed as follows: From power source G through wires 44 and 49, contact 32, mercury column 33, contact 34, wire 50, resistance 51, wire 52, relay coil 36, and wire 48 to the other terminal of the power source. This will lift the movable relay contact 39 into engagement with the upper pair of fixed contacts 40 and 41 and will break the energizing circuit for heating element 35. Since the additional heat is no longer being imparted to the thermostat, and the temperature prevailing at the thermostat is not high enough to hold the mercury column in engagement with the upper contact 34, the mercury column will soon fall so as to break the relay-energizing circuit and permit the movable contact 39 to again fall into engagement with the fixed contacts 42 and 43 and thus again complete the energizing circuit for heating element 35. As a consequence the relay will be intermittently energized and deenergized, the rapidity of the relay movements depending upon the magnitude of the differential between the temperature prevailing at the location of thermostat E and the predetermined temperature at which the thermostat is designed to function.

During the intervals that the relay F is energized, a heating circuit for heating element 31 will be completed as follows: From the power source G through wires 44 and 53, heating element 31, wire 54, adjustable resistance 55, wire 56, relay contacts 40, 39 and 41, and wires 57 and 48 to the other terminal of the power source.

In operation, if the prevailing temperature in the space that is being heated is considerably below the desired temperature, the relay F will be deenergized and the heater 35 will be energized for the greater portion of the time, that is it is necessary to almost constantly apply heat by means of heater 35 in order to keep the mercury column in engagement with the upper fixed contact 34 of the thermostat. Under such conditions the heat impulses imparted to heating element 31 of motor D will be relatively short, since the heating circuit therefor will be broken for the greater portion of the time between relay contacts 40 and 41. Since very little heat is applied to the motor D, the displacement member 9 will remain substantially in its lowermost position and a maximum quantity of water will be delivered to generator A so that the steam heating system will operate at substantially its maximum capacity and thus supply the maximum quantity of heat to the space being heated. As the temperature rises within the space, the mercury column 33 will remain in engagement with upper contact 34 for longer intervals of time after heating element 35 has been deenergized, and consequently the heat impulses applied through heater 31 to the motor D will be longer, and the motor will expand upwardly to gradually lift the displacement member 9 thereby decreasing the supply of water to generator A and cutting down the steam supply. Assuming the extreme condition when the desired temperature has been permanently established in the space to be heated, the mercury column will remain in permanent engagement with upper contact 34 and relay F will be permanently energized so as to supply a continuous heating current to heater 31. Under such conditions the motor D would expand to its limit lifting float 9 to its extreme upper position and permitting all of the water to remain in supply tank C so that no steam would be generated and the heating system would be ineffective. Actually, the system will become stabilized at some intermediate point where the heat delivered from radiator B will be just sufficient to offset the heat loss from the space and thus maintain the temperature within the space substantially constant at the desired level.

It will be understood that by properly adjusting the resistances 45 and 55, the heat supplied to the heating elements 35 and 31 may be varied so as to adjust the sensitivity of the apparatus and, within certain limits, the temperatures to be maintained.

We claim:

1. In combination, a closed loop steam heating system comprising a water supply tank, a boiler, means for heating the boiler, an overflow pipe leading from the tank to the boiler, a radiator, a steam pipe leading from the boiler to the radiator, and a drain pipe leading from the radiator to the tank, a displacement member in the supply tank adapted by its position to determine the proportion of the water in the closed system that overflows into the boiler, a thermostatic member for adjusting the position of the displacement member, an electric heating element for the thermostatic member, an energizing circuit for the heating element, a relay including switch mechanism adapted to complete the energizing circuit when the relay is energized and break the energizing circuit when the relay is deenergized, an energizing circuit for the relay, a thermostat responsive to temperature changes in the space being heated and adapted to complete the relay energizing circuit when a predetermined maximum temperature is reached at the thermostat, an electric heating element associated with the thermostat, and an energizing circuit for the last mentioned heating element which is closed by the relay-operated switch mechanism only when the relay is deenergized.

2. In combination, a closed loop steam heating system comprising a water supply tank, a boiler, a supply pipe leading from the tank to the boiler, a radiator, a steam pipe leading from the boiler to the radiator, and a drain pipe leading from the radiator to the tank, means for selectively determining the proportion of the water in the closed system that flows from the tank into the boiler, a thermostatic member for actuating the selecting means, an electric heating element for the thermostatic member, an energizing circuit for the heating element, a relay including switch mechanism adapted to complete the energizing circuit when the relay is energized and break the energizing circuit when the relay is deenergized, an energizing circuit for the relay, a thermostat responsive to temperature changes in the space being heated and adapted to complete the relay energizing circuit when a predetermined maximum temperature is reached at the thermostat, an electric heating element associated with the thermostat, and an energizing circuit for the last mentioned heating element which is closed by the relay operated switch mechanism only when the relay is deenergized.

3. In combination, a closed loop steam heating system comprising a water supply tank, a boiler, a supply pipe leading from the tank to the boiler, a radiator, a steam pipe leading from the boiler to the radiator, and a drain pipe leading from the radiator to the tank, a water displacement float positioned within the tank, stems extending upwardly and downwardly from the float, balancing and sealing diaphragms mounted in the upper and lower walls of the tank to which the respective stems are attached, a spring positioned to oppose the buoyancy of the float, and means acting on one of the stems for adjusting the vertical position of the float to determine the proportion of the water in the closed system that overflows through the supply pipe into the boiler.

4. In combination, a closed loop steam heating system comprising a water supply tank, a boiler, a supply pipe leading from the tank to the boiler, a radiator, a steam pipe leading from the boiler to the radiator, and a drain pipe leading from the radiator to the tank, a water displacement float positioned within the tank, stems extending upwardly and downwardly from the float, balancing and sealing diaphragms mounted in the upper and lower walls of the tank to which the respective stems are attached, a spring positioned to oppose the buoyancy of the float, and thermostatically actuated means acting on one of the stems for adjusting the vertical position of the float to determine the proportion of the water in the closed system that overflows through the supply pipe into the boilers.

5. In combination, a closed loop steam heating system comprising a water supply tank, a boiler, a supply pipe leading from the tank to the boiler, a radiator, a steam pipe leading from the boiler to the radiator, and a drain pipe leading from the radiator to the tank, a water displacement float positioned within the tank, stems extending upwardly and downwardly from the float, balancing and sealing diaphragms mounted in the upper and lower walls of the tank to which the respective stems are attached, a spring positioned to oppose the buoyancy of the float, and means acting on one of the stems for adjusting the vertical position of the float to determine the proportion of the water in the closed system that overflows through the supply pipe into the boiler, said means comprising a thermostatic motor, an electric heating element for said motor, and means for selectively energizing the heating element.

6. In combination, a closed loop steam heating system comprising a water supply tank, a boiler, a supply pipe leading from the tank to the boiler, a radiator, a steam pipe leading from the boiler to the radiator, and a drain pipe leading from the radiator to the tank, a water displacement float positioned within the tank, stems extending upwardly and downwardly from the float, balancing and sealing diaphragms mounted in the upper and lower walls of the tank to which the respective stems are attached, a spring positioned to oppose the buoyancy of the float, and means acting on one of the stems for adjusting the vertical position of the float to determine the proportion of the water in the closed system that overflows through the supply pipe into the boiler, said means comprising a thermostatic motor, an electric heating element for said motor, an energizing circuit for the heating element, and thermostatic means responsive to temperature changes in the space being heated for selectively determining the heating effect of the heating element.

7. In combination, a closed loop steam heating system comprising a water supply tank, a boiler, a supply pipe leading from the tank to the boiler, a radiator, a steam pipe leading from the boiler to the radiator, and a drain pipe leading from the radiator to the tank, a water displacement float positioned within the tank, stems extending upwardly and downwardly from the float, balancing and sealing diaphragms mounted in the upper and lower walls of the tank to which the respective stems are attached, a spring positioned to oppose the buoyancy of the float, and means acting on one of the stems for adjusting the vertical position of the float to determine the proportion of the water in the closed system that overflows through the supply pipe into the boiler, said means comprising a thermostatic motor, an electric heating element for said motor, an energizing circuit for the heating element, and means for selectively determining the heating effect of the heating element in accordance with temperature changes in the space being heated comprising a thermostat and circuit-interrupting means cooperating with the thermostat to vary the duration of heat impulses imparted to the heating element in proportion to variations in the prevailing temperature at the thermostat from a predetermined desired temperature.

8. In combination, a closed loop steam heating system comprising a water supply tank, a boiler, a supply pipe leading from the tank to the boiler, a radiator, a steam pipe leading from the boiler to the radiator, and a drain pipe leading from the radiator to the tank, a water displacement float positioned within the tank, stems extending upwardly and downwardly from the float, balancing and sealing diaphragms mounted in the upper and lower walls of the tank to which the respective stems are attached, a spring positioned to oppose the buoyancy of the float, and means acting on one of the stems for adjusting the vertical position of the float to determine the proportion of the water in the closed system that overflows through the supply pipe into the boiler, said means comprising a thermostatic motor, an electric heating element for said motor, an energizing circuit for the heating element, a relay including switch mechanism adapted to complete the energizing circuit when the relay is energized and break the energizing circuit when the relay is deenergized, an energizing circuit for the relay, a thermostat responsive to temperature changes in the space being heated and adapted to complete the relay energizing circuit when a predetermined maximum temperature is reached at the thermostat, an electric heating element associated with the thermostat, and an energizing circuit for the last mentioned heating element which is closed by the relay operated switch mechanism only when the relay is deenergized.

9. In combination, a closed loop steam heating system comprising a water supply tank, a boiler, a supply pipe leading from the tank to the boiler, a radiator, a steam pipe leading from the boiler to the radiator, and a drain pipe leading from the radiator to the tank, a water displacement float positioned within the tank, stems extending upwardly and downwardly from the float, balancing and sealing diaphragms mounted in the upper and lower walls of the tank to which the respective stems are attached, a spring positioned to oppose the buoyancy of the float, and means acting on one of the stems for adjusting the vertical position of the float to determine the proportion of the water in the closed system that overflows through the supply pipe into the boiler, said means comprising an expansible bellows containing a heat responsive fluid, a support for one end of the bellows, the other end operatively engaging one of the stems, a similar equalizing bellows having one end fixed, means connecting the other end of the equalizing bellows with the support so as to bodily adjust the first mentioned bellows to compensate for changes in atmospheric conditions affecting the two bellows, an electric heating element associated with the first mentioned bellows, and means for selectively energizing this heating element.

10. In combination, a closed loop steam heating system comprising a water supply tank, a boiler, a supply pipe leading from the tank to the boiler, a radiator, a steam pipe leading from the boiler to the radiator, and a drain pipe leading from the radiator to the tank, a water displacement float positioned within the tank, stems extending upwardly and downwardly from the float, balancing and sealing diaphragms mounted in the upper and lower walls of the tank to which the respective stems are attached, a spring positioned to oppose the buoyancy of the float, and means acting on one of the stems for adjusting the vertical position of the float to determine the proportion of the water in the closed system that overflows through the supply pipe into the boiler, said means comprising an expansible bellows containing a heat responsive fluid, a support for one end of the bellows, the other end operatively engaging one of the stems, a similar equalizing bellows having one end fixed, means connecting the other end of the equalizing bellows with the support so as to bodily adjust the first mentioned bellows to compensate for changes in atmospheric conditions affecting the two bellows, an electric heating element associated with the first mentioned bellows, an energizing circuit for the heating element, and means for selectively determining the heating effect of the heating element in accordance with temperature changes in the space being heated comprising a thermostat and circuit-interrupting means cooperating with the thermostat to vary the duration of heat impulses imparted to the heating element in proportion to variations in the prevailing temperature at the thermostat from a predetermined desired temperature.

11. In combination, a closed loop steam heating system comprising a water supply tank, a boiler, a supply pipe leading from the tank to the boiler, a radiator, a steam pipe leading from the boiler to the radiator, and a drain pipe leading from the radiator to the tank, a water displacement float positioned within the tank, stems extending upwardly and downwardly from the float, balancing and sealing diaphragms mounted in the upper and lower walls of the tank to which the respective stems are attached, a spring positioned to oppose the buoyancy of the float, and means acting on one of the stems for adjusting the vertical position of the float to determine the proportion of the water in the closed system that overflows through the supply pipe into the boiler, said means comprising an expansible bellows containing a heat responsive fluid, a support for one end of the bellows, the other end operatively engaging one of the stems, a similar equalizing bellows having one end fixed, means connecting the other end of the equalizing bellows with the support so as to bodily adjust the first mentioned bellows to compensate for changes in atmospheric conditions affecting the two bellows, an electric heating element associated with the first mentioned bellows, an energizing circuit for the heating element, a relay including switch mechanism adapted to complete the energizing circuit when the relay is energized and break the energizing circuit when the relay is deenergized, an energizing circuit for the relay, a thermostat responsive to temperature changes in the space being heated and adapted to complete the relay energizing circuit when a predetermined maximum temperature is reached at the thermostat, an electric heating element associated with the thermostat, and an energizing circuit for the last mentioned heating element which is closed by the relay operated switch mechanism only when the relay is deenergized.

PAUL B. PARKS.
WILLIAM M. SMITH.